(12) United States Patent
Strickland (10) Patent No.: US 9,636,820 B1
(45) Date of Patent: May 2, 2017

(54) PINECONE COLLECTING DEVICE

(71) Applicant: Phillip Strickland, Swartz Creek, MI (US)

(72) Inventor: Phillip Strickland, Swartz Creek, MI (US)

( * ) Notice: Subject to any disclaimer, the term of this patent is extended or adjusted under 35 U.S.C. 154(b) by 0 days.

(21) Appl. No.: 14/938,188

(22) Filed: Nov. 11, 2015

(51) Int. Cl.
| F41B 13/10 | (2006.01) |
| B25J 1/04 | (2006.01) |
| B25J 15/00 | (2006.01) |

(52) U.S. Cl.
CPC ............. *B25J 1/04* (2013.01); *B25J 15/0071* (2013.01)

(58) Field of Classification Search
CPC . B25J 1/04; B25J 15/0071; E01H 2001/1233; E01H 1/12; E01H 2001/1293; A01D 7/10; A01D 9/06
USPC ...... 294/182, 61, 50.5, 50; 56/400.08, 400.1
See application file for complete search history.

(56) References Cited

U.S. PATENT DOCUMENTS

| 1,053,418 | A | * | 2/1913 | Martin | E01H 1/12 294/50.5 |
| 1,801,084 | A | * | 4/1931 | Huie | A47G 21/023 294/61 |
| 2,500,647 | A | * | 3/1950 | Schulthess | E01H 1/12 294/50 |
| 2,552,467 | A | * | 5/1951 | Thomas | E01H 1/12 294/61 |
| 2,695,188 | A | * | 11/1954 | Nutt | E01H 1/12 294/61 |
| 2,738,215 | A | * | 3/1956 | Thompson | E01H 1/12 294/61 |
| 2,800,354 | A | * | 7/1957 | King | E01H 1/12 294/50.5 |
| 2,804,336 | A | * | 8/1957 | Thompson | A01D 11/00 294/50 |
| 3,633,958 | A | * | 1/1972 | Mesrobian | A01D 51/00 294/50 |
| 4,081,192 | A | * | 3/1978 | Jones | A01D 9/06 294/61 |
| 4,214,741 | A | * | 7/1980 | Crawford | B65H 3/22 271/18.3 |
| 4,422,681 | A | * | 12/1983 | Laroche | E01H 1/1206 294/1.4 |
| 4,791,995 | A | * | 12/1988 | Hochlan, Jr. | A01B 1/243 111/99 |
| 4,856,835 | A | * | 8/1989 | Pacione | A47L 13/00 15/105 |
| 5,004,283 | A | * | 4/1991 | Sullivan | A01B 1/16 294/50 |

(Continued)

*Primary Examiner* — Gabriela Puig
(74) *Attorney, Agent, or Firm* — Dinsmore & Shohl LLP (57) ABSTRACT

A device configured to collect and dispel pinecones is provided. The device includes a handle, and a collecting head. The collecting head includes a plurality of prongs extending outwardly from an outer surface of the head. A sliding block having a plurality of holes configured to receive a corresponding prong is slidingly attached to the shaft. A biasing member having one end fixedly attached to the shaft and the other end attached to the sliding block continuously urges the sliding block against the head so as to allow the prongs to protrude through the respective holes. Accordingly, the device is configured to stick a plurality of pinecones wherein the sliding block may be pushed so as to displace the sliding block forward of the head pushing the pinecones off the prongs and into the receptacle.

7 Claims, 8 Drawing Sheets

(56) References Cited

U.S. PATENT DOCUMENTS

| | | | | |
|---|---|---|---|---|
| 5,005,888 A * | 4/1991 | Parks | ............. | A01B 1/16 294/50 |
| 5,193,871 A * | 3/1993 | Williams | ............. | A01B 1/16 294/50 |
| 5,207,466 A * | 5/1993 | Ohlson | ............. | A01B 1/14 172/21 |
| 5,261,496 A * | 11/1993 | Smotherman | ............. | A01B 1/16 172/25 |
| 5,370,433 A * | 12/1994 | Yost | ............. | A01D 51/00 294/50.5 |
| 5,490,701 A * | 2/1996 | Glass | ............. | A01B 1/00 294/182 |
| 5,642,911 A * | 7/1997 | Gatch | ............. | E01H 1/12 294/50 |
| 6,309,001 B1 * | 10/2001 | Sherwin | ............. | A21C 9/08 294/100 |
| 6,634,162 B1 | 10/2003 | Andros | | |
| 6,634,163 B2 * | 10/2003 | Kill | ............. | A01D 51/00 56/400.03 |
| 7,784,257 B2 * | 8/2010 | Williams | ............. | E01H 1/12 172/378 |
| 8,002,319 B1 * | 8/2011 | Hahn | ............. | E01H 1/1206 294/1.4 |
| 2005/0082854 A1 * | 4/2005 | Barr | ............. | E01H 1/1206 294/1.4 |

* cited by examiner

PINECONE COLLECTING DEVICE

FIELD OF THE INVENTION

The present invention is related to a device configured to collect and disperse pinecones.

BACKGROUND OF THE INVENTION

Devices for collecting pinecones are currently known and used. Such devices include rakes wherein the user has to rake the pinecones into a pile, pick the pinecones up, and throw the pinecones into a dispensing bin. However, such devices require the user to perform multiple steps to clear a yard of pinecones. In particular, the user must first collect the pinecones into a pile and then pick the pinecones up. Pinecones have pointed ends and thus users must wear gloves in order to prevent the user from being pricked. Accordingly, it remains desirable to have a device configured to collect pinecones and disperse the pinecones into a bin without having to touch the pinecones.

SUMMARY OF THE INVENTION

A device configured to collect and dispel pinecones is provided. The device includes a handle, a dispelling mechanism, and a collecting head. The collecting head includes a plurality of prongs extending outwardly from an outer surface of the head. The prongs are rigidly attached thereto.

A sliding block having a plurality of holes configured to receive a corresponding prong is slidingly attached to the shaft. A biasing member having one end fixedly attached to the shaft and the other end attached to the sliding block continuously urges the sliding block against the head so as to allow the prongs to protrude through the respective holes. Accordingly, the device is configured to stick a plurality of pinecones wherein the user can transfer the head of the device to a receptacle bin and push the sliding block so as to displace the sliding block forward of the head pushing the pinecones off the prongs and into the receptacle.

In one aspect of the device, the device includes a pair of biasing members disposed opposite each other. One end of the biasing members is attached to the shaft and the other end of the biasing members is attached to the sliding bracket vis-à-vis a bracket.

In another aspect of the device, a single biasing member is wrapped around the shaft. One end of the biasing member is fixed to the shaft and the other end of the biasing member is fixed to the sliding block vis-a-vis a bracket.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be better understood when read in conjunction with the following drawings where like structure is indicated with like reference numerals and in which:

DETAILED DESCRIPTION OF THE PREFERRED EMBODIMENTS

A device configured to collect and dispel pinecones is provided. The device includes a handle, a dispelling mechanism, and a collecting head. The collecting head includes a plurality of prongs extending outwardly from an outer surface of the head. The prongs are rigidly attached thereto. A sliding block having a plurality of holes configured to receive a corresponding prong is slidingly attached to the shaft. A biasing member having one end fixedly attached to the shaft and the other end attached to the sliding block continuously urges the sliding block against the head so as to allow the prongs to protrude through the respective holes. Accordingly, the device is configured to stick a plurality of pinecones wherein the user can transfer the head of the device to a receptacle bin and push the sliding block so as to displace the sliding block forward of the head pushing the pinecones off the prongs and into the receptacle.

Figure 1:
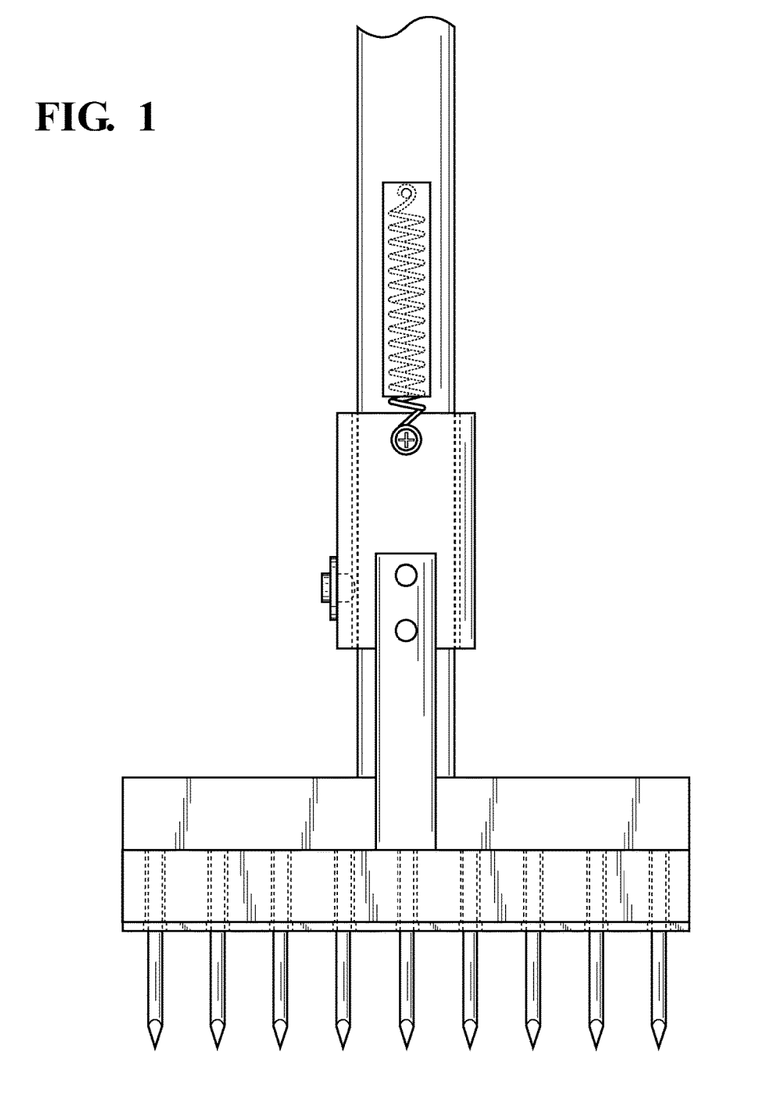
FIG. 1 is a front view of the device in a retracted position.
Figure 2:
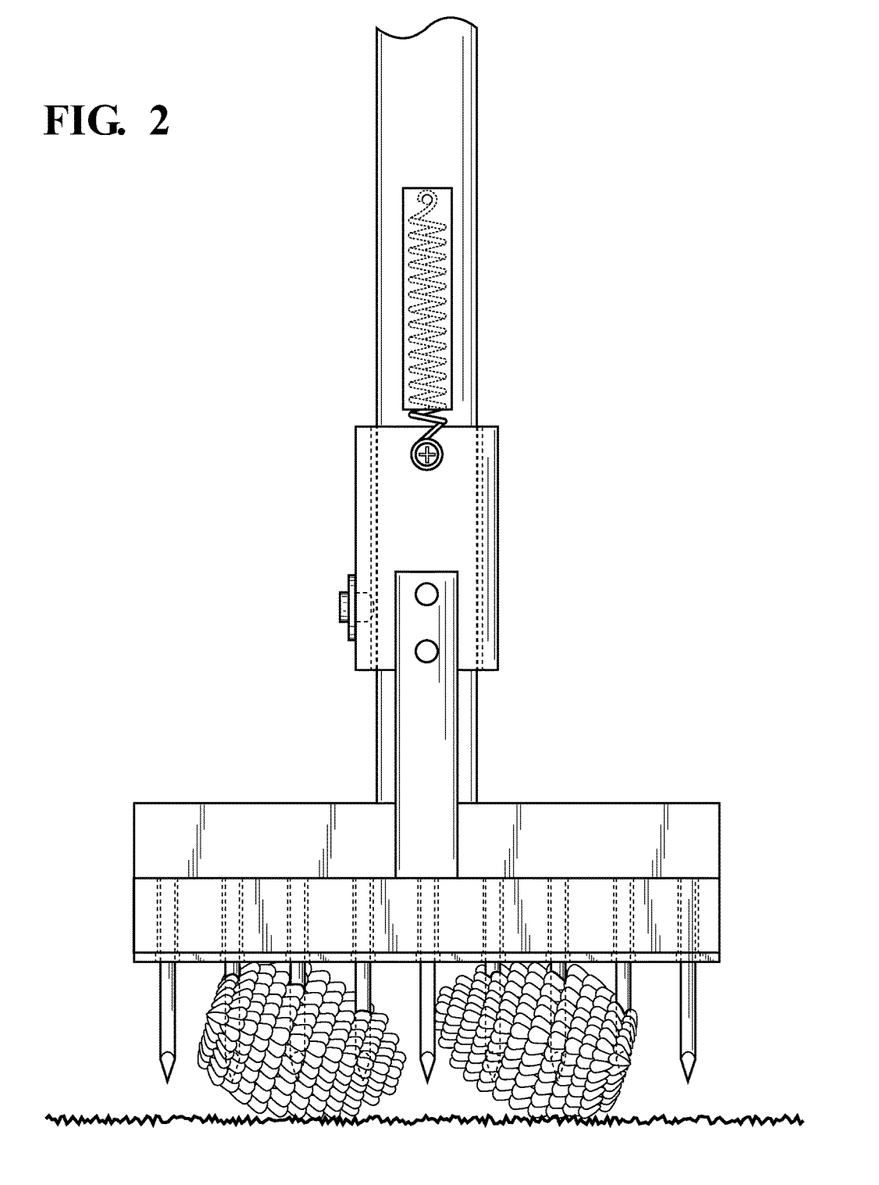
FIG. 2 is a view of FIG. 1 showing the prongs engaging pine cones.
Figure 8:
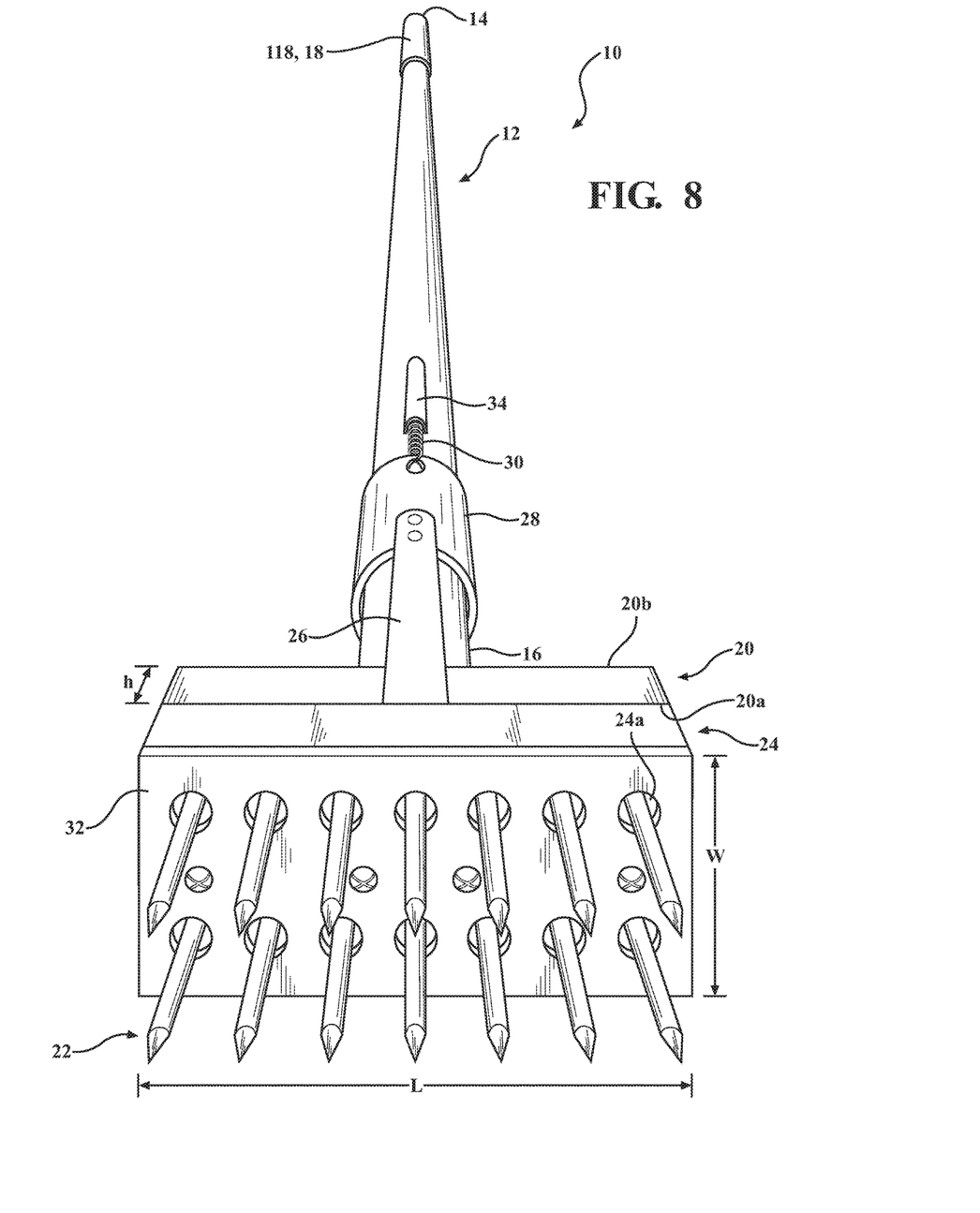
FIG. 8 is a perspective view of FIG. 1 taken from the bottom.

With reference first to FIGS. 1, 2 and 8, a view of the front of the device 10 is provided. The device 10 includes a shaft 12 having a proximal end 14 (shown in FIG. 8) opposite a distal end 16. A handle 18 (shown in FIG. 8) is formed on the proximal end 14. A head 20 is fixedly attached to the distal end 16 of the shaft 12. The head 20 is a generally solid rectangular member.

With reference now to FIG. 8, the head 20 includes a plurality of prongs 22. The prongs 22 are evenly spaced apart from each other and are formed of a durable and rigid material such as steel. For illustrative purposes the head 20 is shown as having a width "w" of three (3) inches and a length "L" of eight (8) inches and a height "h" of two and a half "2½" inches. However, it should be appreciated by those skilled in the art that the head 20 may have other dimensions without deviating from the scope and spirit of the claims. FIG. 1 shows the head 20 having sixteen (16) prongs 22. However, it should be appreciated that the number of prongs 22 may change based upon the surface area of the head 20.

Figure 3:
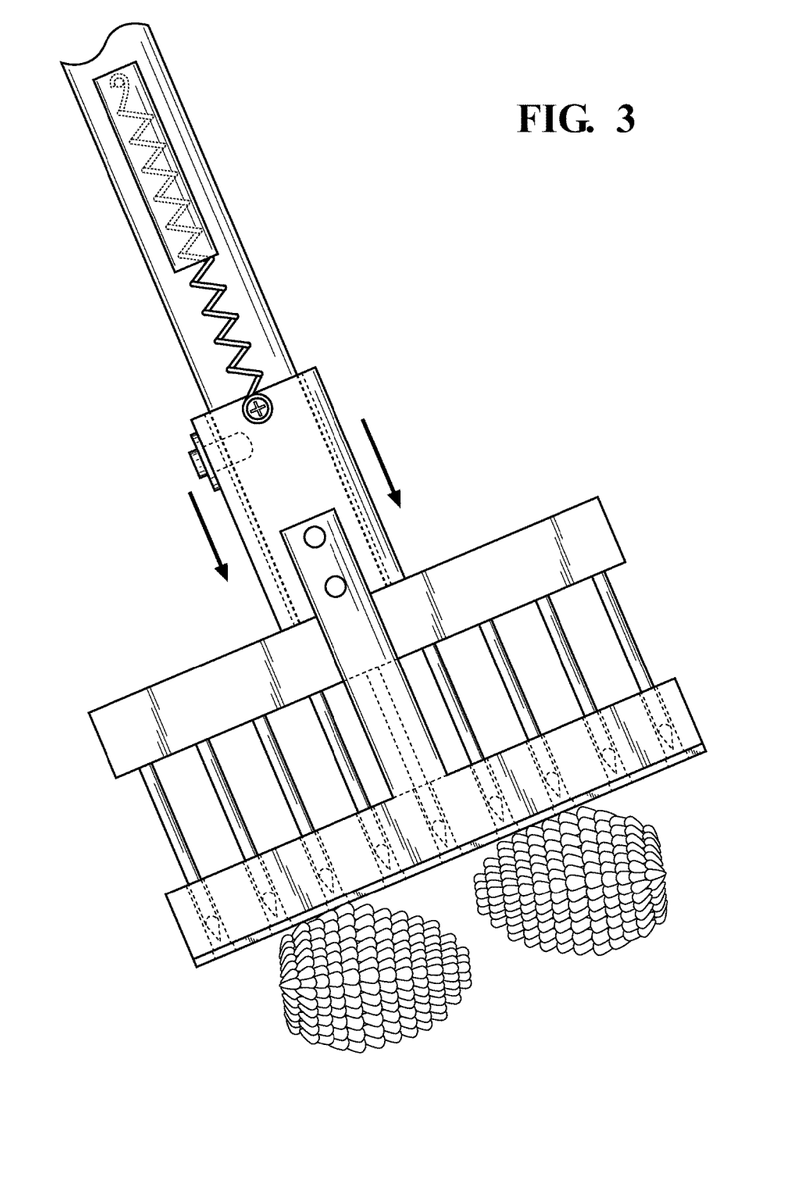
FIG. 3 is a view of the device shown in FIG. 2, dispensing pine cones from the prongs.
Figure 4:
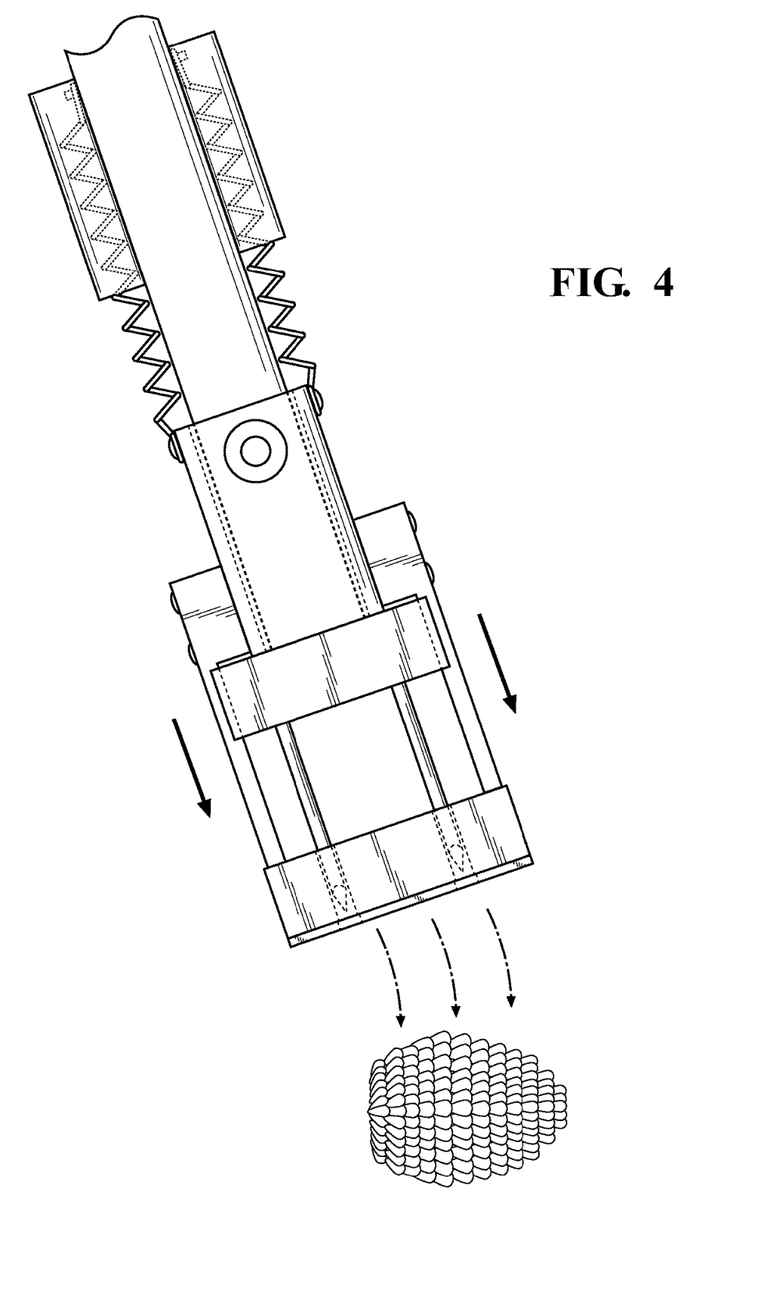
FIG. 4 is a side view of the device shown in FIG. 3.

With reference now to FIGS. 3, 4 and 8, a sliding block 24 is slidably attached to the shaft 12. The sliding block 24 includes a plurality of through-holes 24a. A respective prong 22 is disposed within a respective through-hole 24a. A bracket 26 is fixedly mounted to a collar 28. The collar 28 is concentric to the shaft 12. The bracket 26 attaches the collar 28 to the sliding block 24 so as to space the collar 28 apart from the sliding block 24 and maintain the collar 28 in a fixed position with respect to the sliding block 24.

A biasing member 30 is attached to an upper end of the collar 28 on one end and the other end of the biasing member 30 of the biasing member 30 is fixedly attached to the shaft 12. Accordingly, it should be appreciated that the biasing member 30 continuously urges the sliding block 24 up against the face 20a of the head 20 as shown in FIG. 1 wherein the prongs 22 pass through a respective hole of the sliding block 24.

With reference again to FIG. 2, in collecting position wherein the prongs 22 have engaged a plurality of cones. In particular, the biasing member 30 operates to retain the sliding block 24 up against the face 20a of the head 20 wherein the prongs 22 are exposed and ready to pierce pinecones.

The device 10 may further include a metal plate 32. The metal plate may be dimensioned in length and width similar to that of the sliding block 24. The metal plate 32 is fixedly mounted to the distal end of the sliding block 24. The metal plate 32 helps prevent pine cones from sticking to the sliding block 24.

The device 10 may further include a pair of shields 34. Each shield covers the biasing member so as to prevent the biasing member from pinching the user. The pair of shields are a pair of tubular members and may be formed of a durable and weather proof material such as a polypropelene.

With reference now to FIG. 3, the sliding block 24 is shown in a dispensing position. In the dispensing position the collar 28 is urged downwardly overcoming the force of the biasing member 30 wherein the collar 28 abuts against a back surface 20b of the head 20. The bracket 26 pushes the sliding block 24 away from the head 20, wherein a front surface 24a of the sliding block 24 is at least past the distal ends 22a of the respective prongs 22 thereby pushing the pinecones off of the device 10. As the sliding block 24 is pushed away from the head 20, the through holes 24a move along the axial length of a respective prong 22.

Figure 5:
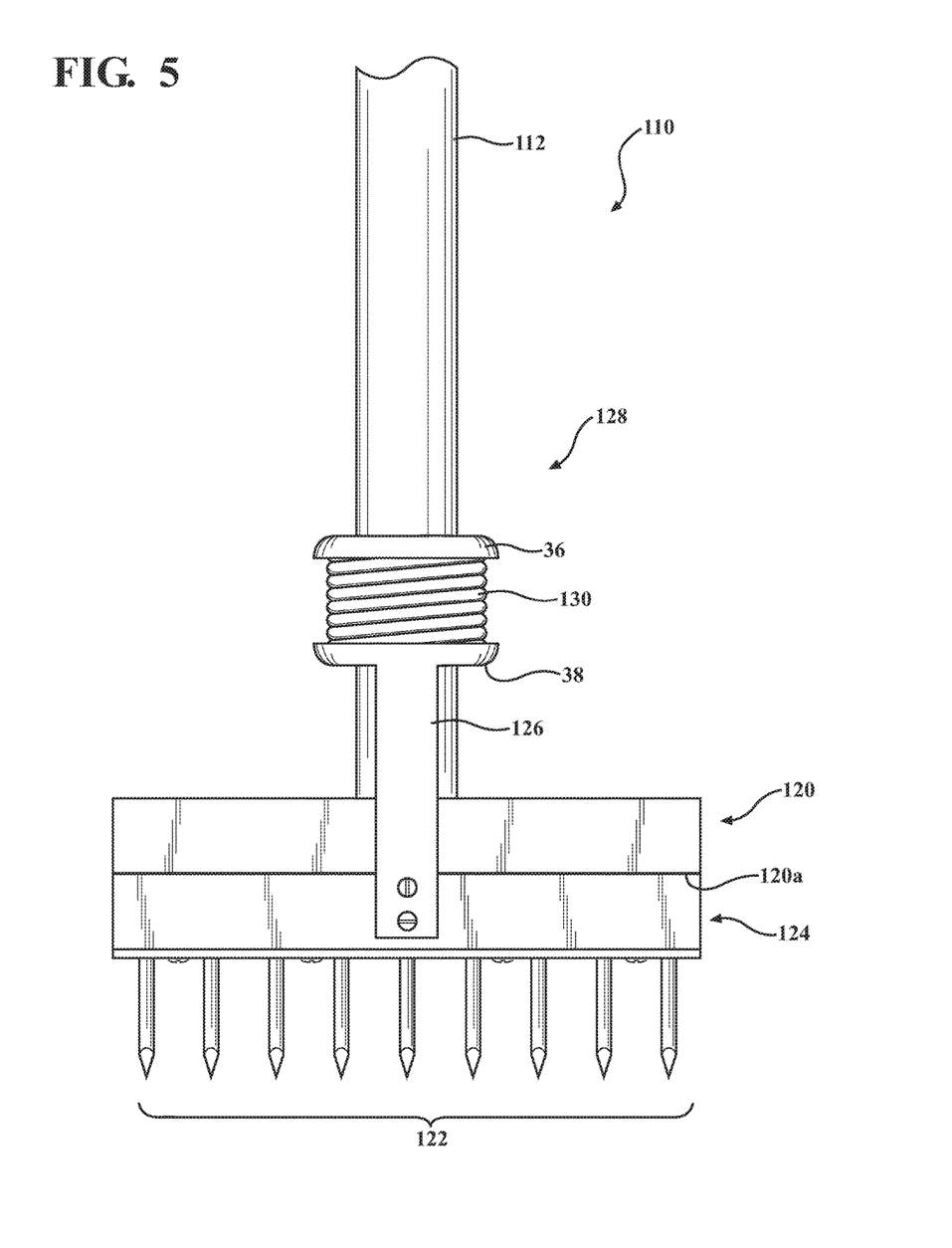
FIG. 5 is a front view of a second aspect of the device.
Figure 6:
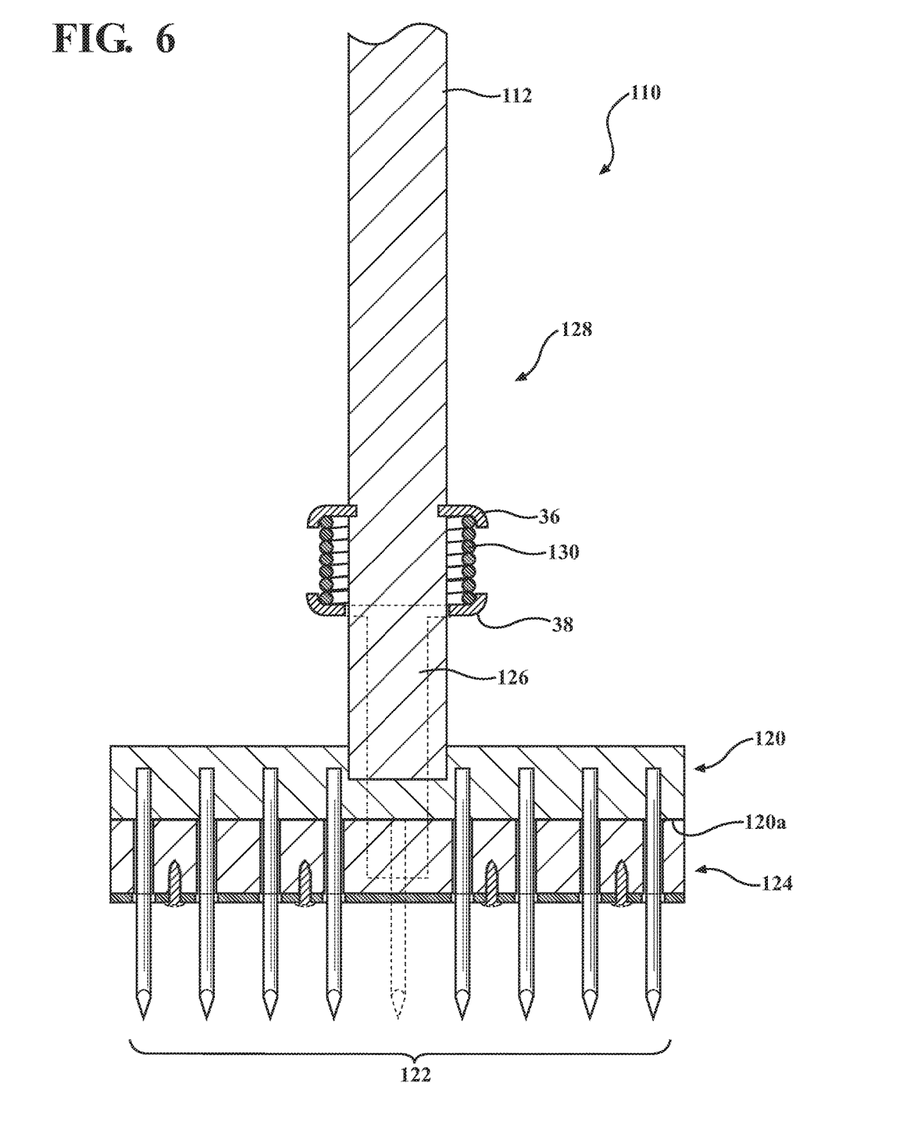
FIG. 6 is a cross-sectional view of FIG. 4 taken along lines 6-6.
Figure 7:
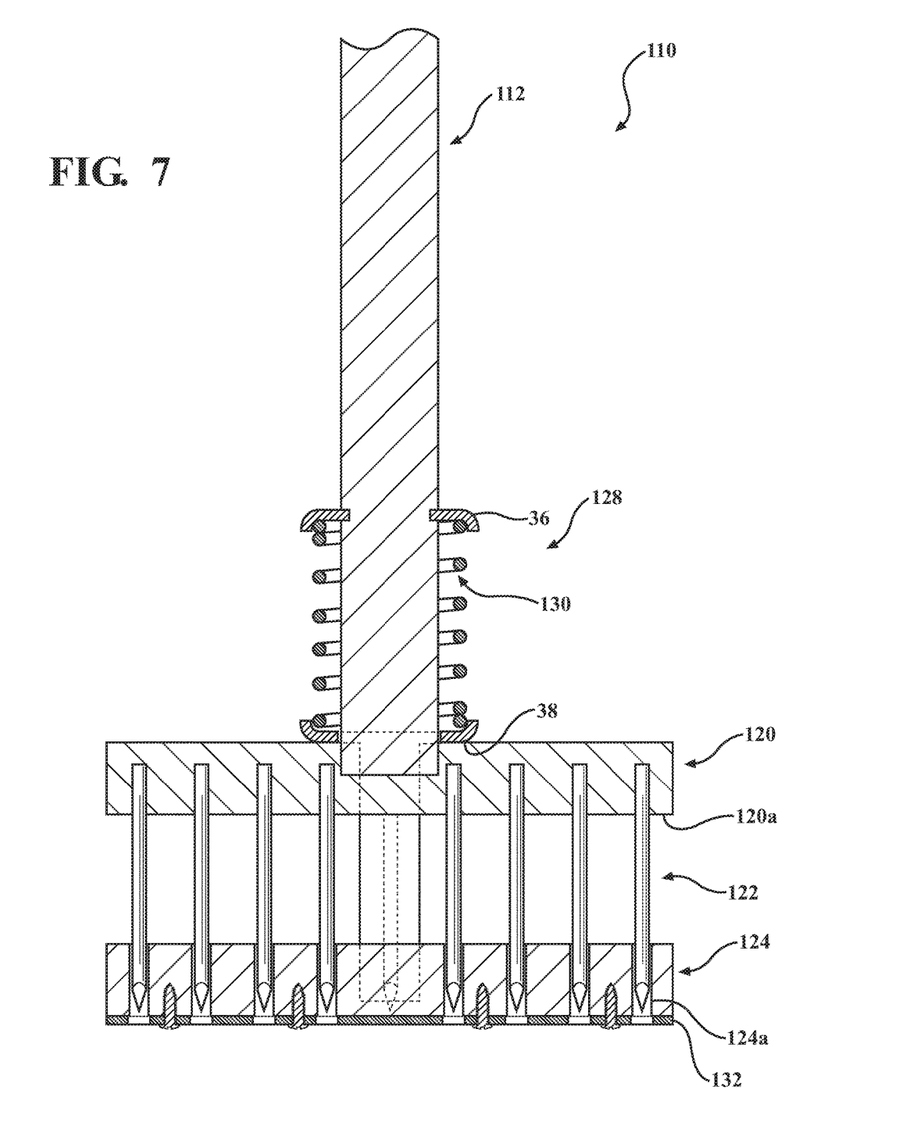
FIG. 7 is a view of FIG. 6 taken along lines 7-7, showing the sliding block pushed away from the head.

With reference now to FIGS. 5-7, a second aspect of the device 10 is shown wherein like elements are referenced by like numbers increased by 100. The device 110 includes a single biasing members 130 (shown in FIG. 6). FIG. 5 shows the device 110 in the collecting position wherein the prongs 122 are extend through respective holes of the sliding block 124. The biasing member 130 urges the sliding block 124 up against the head 120.

The collar 128 includes a side wall 36 with an open top and a bottom wall 38. A proximal end of the biasing member is fixed to the shaft 112 and a distal end of the biasing member 130 is fixed to a bottom wall 38 of the collar 128. The bracket 126 is fixed on one end to the bottom wall 38 of the collar 128 and to the sliding block 124 on the other end.

FIG. 6 is a cross-sectional view of FIG. 5 taken along lines 6-6. As seen, the biasing member 130 is a singular helical spring concentric to the shaft 12. One end of the biasing member 130 is fixed to the shaft 112. The device 110 further includes a second housing portion 36b. The second housing portion 36b is slidable with respect to the shaft 112. The second housing portion 36b includes an aperture wherein the shaft 112 is slidable within the aperture. The second housing portion 36b is also a disc and includes a radial lip extending upwardly. A distal end of the biasing member 30 is fixedly mounted to the second housing portion 36b.

FIG. 7 is a view of FIG. 6 showing the sliding block 124 pushed away from the head 120. FIG. 7 shows the biasing member 130 stretched and the collar 128 is moved down relative to FIG. 6. The bottom wall 38 of the collar 128 abuts against the back surface 20b of the head 120. As with the first aspect of the device 10, the sliding block 124 is moved away from the face 120a of the head 120 wherein the metal plate 32 pushes any pine cones stuck by the prongs 122 away from the device 110.

In operation of the device 10, 110 in both aspects is now provided. In operation, the user grabs the handle 18, 118 wherein the biasing member 30, 130 is free to urge the sliding block 24, 124 towards the head 20, 120 exposing prongs 22, 122. The user simply jabs the prongs 22, 122 onto a plurality of pinecones wherein the pinecones are stuck by the prongs 22, 122. The user simply lifts the head 20, 120 to a receptacle and then pushes the collar 28, 128 towards the head 20, 120 wherein the sliding block 24, 124 ejects the pinecones from the prongs 22, 122 and the user releases the collar 28, 128 wherein the biasing member(s) 30, 130 retracts the sliding block 24, 124 back towards the head 20, 120 and the device 10, 110 is ready for use again.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination.

I claim:

1. A device for collecting pinecones, the device comprising:
   a shaft having a proximal end opposite a distal end;
   a head fixedly mounted to the distal end of the shaft, the head including a plurality of prongs extending outwardly from a face of the head;
   a sliding block having a plurality of through holes, each through hole configured to receive a respective prong of the plurality of prongs;
   a collar concentric to the shaft so as to be slidable along the shaft, the collar having a bracket fixedly mounted to the collar on one end and the sliding block on the other end, the bracket positioning the sliding block in a fixed position with respect to the collar;
   a biasing member, one end of the biasing member fixed to the shaft, the other end of the biasing member fixedly attached to the sliding block wherein the biasing member is a pair of biasing members, each disposed opposite each other; further including a pair of shields, each one of the pair of shields covering the biasing member so as to prevent the biasing member from pinching the user.

2. The device as set forth in claim 1, wherein each prong of the plurality of prongs are evenly spaced apart from each other.

3. The device as set forth in claim 2, wherein the head has a width of three (3) inches, a length of eight (8) inches and a height of two and a half "2½" inches.

4. The device as set forth in claim 3, wherein the sliding block has the same dimension as the head.

5. The device as set forth in claim 1, wherein the pair of shields are a pair of tubular members.

6. The device as set forth in claim 5, further including a pair of mounting pins, a respective biasing member fixedly mounted to a respective mounting pin of the pair of mounting pins, the mounting pins are opposite each other and protrude from the shaft, the pair of mounting pins extend into an inner space of a respective one of the pair of shields, mounting pins spacing the biasing members away from the shaft.

7. The device as set forth in claim 6, further including a metal plate mounted onto the face of the sliding block, the metal plate preventing pinecones from sticking to the sliding block.

* * * * *